United States Patent Office 3,336,368
Patented Aug. 15, 1967

3,336,368
CATALYTIC CRACKING PROCESS FOR PREPARING N-VINYL-CARBAMIC ACID ESTERS
Wolfram Schwiersch, Frankfurt am Main, and Robert Hartwimmer, Hofheim, Taunus, Germany, assignors to Farbwerke Hoechst Aktiengesellschaft vormals Meister Lucius & Bruning, Frankfurt am Main, Germany, a corporation of Germany
No Drawing. Filed May 4, 1964, Ser. No. 364,778
Claims priority, application Germany, Feb. 14, 1964
F 41,999
2 Claims. (Cl. 260—482)

It is known that N-vinyl-carbamic acid esters can be prepared by addition of alcohols on vinyl-isocyanate (Mh. Chem. 92, 303 (1961) and Makromol. Chem. 31, 230 (1959)) or by transvinylation of carbamic acid esters with alkylvinyl ethers (U.S. Patent No. 3,019,231).

The present invention is based on the observation that N-vinyl-carbamic acid esters of the general formula

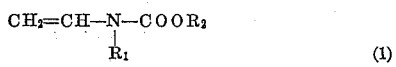

in which $R_1$ represents a hydrogen atom or an alkyl group preferably containing 1 to 4 carbon atoms and $R_2$ represents an alkyl group preferably containing 1 to 4 carbon atoms, can be prepared by catalytic cracking of (N-($\alpha$-alkoxyethyl)-carbamic acid esters or N-($\alpha$-alkoxyethyl)-N-alkyl-carbamic acid esters of the general formula

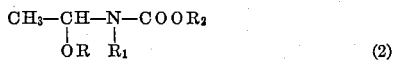

in which R represents an alkyl group preferably containing 1 to 4 carbon atoms and $R_1$ and $R_2$ have the meanings indicated above, in the presence of insoluble inorganic or organic compounds imparting to the N-($\alpha$-alkoxyethyl) compounds an acid pH-value, preferably in the range from about 3 to 5.5.

As N-($\alpha$-alkoxyethyl) compounds capable of being cracked according to the process of the present invention there may be mentioned, for example, the following compounds: N-($\alpha$-methoxyethyl)-carbamic acid ester, N-($\alpha$-ethoxyethyl)-carbamic acid ester, N-($\alpha$-isobutoxyethyl)-carbamic acid ethylester, N-($\alpha$-methoxyethyl)-carbamic acid n-butylester, N-($\alpha$-ethoxyethyl)-carbamic acid n-butylester, N-($\alpha$-isobutoxyethyl)-carbamic acid n-butylester, N - ($\alpha$ - isopropoxyethyl)-N-methyl-carbamic acid methylester, N - ($\alpha$ - isobutoxyethyl) - N-methyl-carbamic acid ethylester and N-($\alpha$-methoxyethyl)-N-butyl-carbamic acid methylester.

As has been suggested, the N-$\alpha$-alkoxyethyl-substituted carbamic acid esters used as starting compounds are prepared without difficulty and in a good yield by reacting carbamic acid esters, which carry at least 1 hydrogen atom capable of being substituted on the nitrogen atom, with acetals, hemiacetals or acetal-forming components, in the presence of acid catalysts.

As catalysts there may be used according to the process of the present invention, for example, carboxylic acids, dicarboxylic acids, tricarboxylic acids, hydroxy-carboxylic acids, hydroxy-dicarboxylic acids, keto-carboxylic acids or cyano-carboxylic acids.

Of the many compounds belonging to the categories of acids indicated above there may be mentioned, for example, the following compounds: oxalic acid, succinic acid, tartaric acid, malic acid, lactic acid, critic acid, hydroxy-butyric acid, adipic acid, mesoxalic acid, hydroxy-pivalic acid, glutaric acid and itaconic acid.

As inorganic cracking catalysts there may be used weak to medium-strong inorganic acids, for example, phosphoric acid.

The catalysts mentioned may be used separately or as a mixture.

The soluble acid catalysts used in the process of the present invention are even active when applied in a quantity of 1–2 mols per mille.

The cracking is advantageously carried out at temperatures in the range from about 50° to 200° C. The optimum cracking temperature to be applied in each individual case depends on the compound to be cracked. The reaction may as well be carried out at temperatures above or below the range indicated above. In these cases, such inconveniences as low reaction speed, poor yields or decomposition cannot be avoided.

The pressure to be applied during the reaction has to be chosen so as to ensure that the reaction takes place within an optimum temperature range and the cracking products can be eliminated at the same time over a column.

When carrying out the reaction it is advantageous to introduce the N-($\alpha$-alkoxy) compounds, together with the catalyst and small amounts of hydroquinone as stabilizer for the vinyl compound which is obtained as reaction product, into the reaction vessel and to heat the whole, if desired, under reduced pressure, while passing through a stream of nitrogen, until the total quantity of the cracking products, which are subsequently once more subjected to fractional distillation, has passed over a distilling column. If desired, the fractional distillation may be effected already during the cracking.

It may be considered suprising that the N-($\alpha$-alkoxyethyl)-carbamic acid esters and N-($\alpha$-alkoxyethyl)-N-alkyl-carbamic acid esters can be converted, in the presence of soluble substances having a weakly acid reaction, in a smooth reaction, into the corresponding N-vinyl compounds. Acid substances having an acidity which exceeds that of the substances used in the process of the present invention permit the cracking of the carbamic acid esters to take place rapidly, but, in addition, they cause polymerization or destruction of the N-vinyl-carbamic acid esters formed and thus result in intolerable losses in yields. Alkaline or neutral catalysts produce either no effect at all on the material to be cracked or they provoke reactions with different results.

As compared with the processes known, the process of this invention offers the advantage that the starting compounds which are easily accessible according to a single-stage process can be converted through a cracking reaction having a selective effect, in a smooth reaction and in a good yield, into the N-vinyl compounds. Another advantage consists in the fact that the separated alcohol can be used again for the preparation of the starting compound.

The reaction rates of the process of the present invention amount to about 90%, the yield to about 95% of the theory. Cracking times are relatively short and the cracking takes place under mild conditions judging from the fact that neither undesired black coloration nor decomposition in the sump occur. Moreover, when proceeding according to the process of the present invention, colorless distillates are obtained immediately and after one single rectification the products are already obtained in pure state showing impurities of about 1 per mille.

The N-vinyl-carbamic acid esters and N-vinyl-N-alkyl-carbamic acid esters prepared according to the process of the present invention constitute valuable perfumes for the perfume industry. Besides, they are excellent starting products for homopolymerization and copolymerization.

The homopolymers prepared from these esters may be used as molded bodies of various kinds and serve also as gap-filling adhesives and surface coatings.

The copolymers prepared from the compounds obtained according to the process of the invention by means of vinylacetate, acrylo-nitrile, methacrylic acid esters, vinylchloride, acrylic acid and acrylic acid amide are resinlike products which may be used as adhesive substances, molded bodies and surface coatings.

Finally, the polyvinylamines obtained through saponification of the homopolymers may be used as starting materials for ion exchangers on the basis of plastics, for the preparation of synthetic fibers having a good dyeability which may be spun and hardened in an aqueous solution and as an addition increasing the hygroscopy and dyeability of synthetic fibers. The commonly known salts of these polyamines are suitable for example as levelling and stripping agents, finishing and sizing agents, catalysts or buffer substances.

The following examples serve to illustrate the invention but they are not intended to limit it thereto, the parts being by weight unless otherwise stated and the relationship of parts by weight to parts by volume being the same as that of the kilogram to the liter.

*Example 1*

0.3 g. (0.002 mol) of tartaric acid and 0.5 g. of hydroquinone are added to 420.6 g. (2.4 mols) of N-(α-ethoxyethyl)-N-methylcarbamic acid ethylester first introduced into a three-necked flask of 1 liter capacity which is equipped with a thermometer, a nitrogen inlet tube and a 30 cm.-column with silver lining and attached head, the mixture is slowly heated at a pressure of 130-140 mm. of mercury and the ethanol as well as the vinyl compound are distilled over in a flask at a sump temperature between 120° and 160° C. within a boiling range from 20° to 110° C., a residue of 8 g. being left over. Another thorough purification of the distillation product (404 g., refractive index: $n_D^{20}$:1.4248) yields 91 g. of ethanol, 230 g. of N-vinyl-N-methyl-carbamic acid ethylester (boiling at 62-63° C. at a pressure of 20 mm. of mercury, refractive index: $n_D^{20}$:1.4500) and 78 g. of an ethoxyvinyl compound. From this results a reaction rate of 81.5% and a yield of 91.3% of the theory.

*Example 2*

757 g. (4 mols) of N-(α-iso-butoxyethyl)-N-methylcarbamic acid methylester with an addition of 0.77 g. (1 mol per mille) of citric acid imparting to the mixture a pH-value of 3.9-4.1, and 0.5 g. of hydroquinone as stabilizer are heated in the apparatus described in Example 1 to 130° C. During 6 hours a mixture of the cracking products having a refractive index in the range from 1.4260 to 1.4310 and a boiling range from 80° to 105° C. is distilled off over a column in a vacuum at a pressure of 170-180 mm. of mercury. A residue of 7 g. is left in the distilling flask. Another fine distillation of the cracking products (743 g.) yields 263 g. (3.55 mols) of isobutanol, 380.5 g. (3.31 mols) of N-vinyl-N-methyl-carbamic acid methylester having a refractive index of $n_D^{20}$:1.4558 and 99 g. (0.524 mol) of N,O-acetal which has not been cracked.

From this results a reaction rate of 86.9% and a yield in N-vinyl-N-methyl-carbamic acid methylester of 95.3% of the theory.

*Example 3*

406.5 g. (2 mols) of N-(α-isobutoxyethyl)-N-methylcarbamic acid ethylester are heated slowly in a three-necked flask of 1 liter capacity which is equipped with a thermometer, a nitrogen inlet tube and a 80 cm.-column with silver lining and attached head, in the presence of 0.3 g. (2 millimols) of tartaric acid and 0.5 g. of hydroquinone as stabilizer at a pressure in the range from 125 to 135 mm. of mercury, while passing through a stream of nitrogen. During 4½ hours and at a sump temperature in the range from 130 to 140° C., 397 g. of the cracking product having a refractive index of $n_D^{20}$:1.4274 pass over at 70-100° C. Another thorough purification yields 138 g. of isobutanol and 222 g. of N-vinyl-N-methyl-carbamic acid ethylester boiling at 60-61° C. at a pressure of 18-19 mm. of mercury and having a refractive index of $n_D^{20}$:1.4500, which corresponds to a reaction rate of 93% and a yield in N-vinyl-N-methyl-carbamic acid ethylester of 92%.

*Example 4*

757 g. (4 mols) of N-(α-isobutoxyethyl)-N-methyl-carbamic acid methylester to which 1 g. (2 mols per mille) of oxalic acid (.2H$_2$O) and 0.5 g. of hydroquinone have been added are slowly heated in the apparatus described in Example 3 at a pressure in the range from 170 to 190 mm. of mercury. The pH-value of the solution amounts to 3.1. When the sump temperature has reached 130-135° C., the cracking products distill over between 80 and 110° C. After 4½ hours, 745.8 g. have passed over, and the reaction flask is practically empty. Subsequent distillation separates 260 g. (3.52 mols) of isobutanol having a refractive index of $n_D^{20}$:1.3959 to 1.3979 from 394 g. (3.42 mols) of N-vinyl-N-methyl-carbamic acid methylester (boiling at 102-103° C. at a pressure of 170 mm. of mercury), 80 g. (0.423 mol) of N,O-acetal which has not been cracked being left over.

From this results a reaction rate of 89.4% and a yield in N-vinyl-N-methyl-carbamic acid methylester of 93.6% of the theory.

*Example 5*

When cracking 757 g. (4 mols) of N-(α-isobutoxyethyl)-N-methyl-carbamic acid methylester with an addition of 0.536 g. (1 mol per mille) of d,l-malic acid as catalyst (pH-value of the solution: 4.37 and 0.5 g. of hydroquinone as stabilizer, in the manner described in Examples 1 to 4, 727 g. of the cracking products having a refractive index of $n_D^{20}$:1.4292 are taken off at the head of the column. Finishing of the cracking products yields 260 g. (3.52 mols) of isobutanol boiling at 72° C. under a pressure of 170 mm. of mercury and 394.5 g. (3.42 mols) of N-vinyl-N-methyl-carbamic acid methylester having a refractive index of $n_D^{20}$:1.4560. 71.5 g. (0.378 mol) of the starting material are recovered, boiling at 148° C. at a pressure of 170 mm. of mercury and having a refractive index of $n_D^{20}$:1.4251.

The reaction rate resulting from this amounts to 90.6%, the yield in N-vinyl-N-methyl-carbamic acid methylester to 94.5% of the theory.

*Example 6*

2.4 g. (2 mols per mille) of tartaric acid and 0.7 g. of hydroquinone are introduced into a two-necked flask of 2 liters capacity containing 1513 g. (8 mols) of N-(α-isobutoxyethyl)-N-methyl-carbamic acid methylester, and a distilling bridge with fractioning column is put on the flask. While passing through a stream of nitrogen the sump is heated to 120-130° C. and the apparatus is evacuated simultaneously at a pressure of 150 mm. of mercury. Within 5 to 6 hours practically the total contents of the flask has distilled over between 70 and 100° C. in the form of the cracking products isobutaneol and vinyl compound. By subsequent distillation 580 g. (7.84 mols) of isobutanol boiling at 70-71° C. at a pressure of 150 mm. of mercury and 857 g. (7.45 mols) of N-vinyl-N-methyl-carbamic acid methylester boiling at 98-100° C. at a pressure of 150 mm. of mercury and having a refractive index of $n_D^{20}$:1.4560 can be isolated. 58 g. (0.307 mol) of N,O-acetal are not cracked.

From this results a reaction rate of 96% and a yield in N-vinyl-N-methyl-carbamic acid methylester of 97% of the theory.

*Example 7*

2362 g. (12.5 mols) of N-(α-n-butoxyethyl)-N-methyl-carbamic acid methylester having a refractive index of $n_D^{20}$:1.4274 are introduced into a two-necked flask of 4 liters capacity which is equipped with a 80 cm.-column with silver lining, a head and a nitrogen inlet tube, 3.76 g. (2 mols per mille) of tartaric acid are added as catalyst and 1 g. of hydroquinone as stabilizer. The solution is heated to the boil at a pressure of 150 mm. of mercury, while passing through nitrogen, and the cracking products are taken away at the head of the column. The contents of the flask is almost dried, the residue amounting to 13 g. The 2340 g. of the distillate are subjected to fractional distillation and separate into 729 g. (10.7 mols) of n-butanol boiling at 80–81° C. at a pressure of 150 mm. of mercury, 1167 g. (10.13 mols) of pure N-vinyl-N-methyl-carbamic acid methylester boiling at 97° C. at a pressure of 140 mm. of mercury and 322 g. (1.7 mol) of N,O-acetal in unchanged condition.

From this results a reaction rate of 86.4% and a yield in N-vinyl-N-methyl-carbamic acid methylester of 94% of the theory.

*Example 8*

378 g. (2 mols) of N-(α-n-butoxyethyl)-N-methyl-carbamic acid methylester are introduced into a two-necked flask of 500 ml. capacity which is equipped with a boiling capillary, a column according to Vigreux and a column head, and acidified by means of 4 drops of pure ortho-phosphoric acid ($H_3PO_4$). This acid addition suffices to impart to the solution a pH-value of 4.2–4.3. The contents of the flask is then heated in a vacuum at a pressure of 150 mm. of mercury to 110–130° C. and at this pressure all the volatile components are distilled off over the column between 75° and 110° C. After 1¾ hours 364 g. of the cracking product having a refractive index of $n_D^{20}$: 1.4283 have passed over, a residue of 14 g. being left. Subsequent fine distillation of the cracking products permits 140 g. (1.89 mols) of n-butanol to be separated from 183 g. (1.59 mols) of N-vinyl-N-methyl-carbamic acid methylester and 23 g. (0.122 mol) of the starting material.

The reaction rate resulting from this amounts to 93.8%, the yield to 84.7% of the theory.

*Example 9*

0.5 g. (3.3 millimols) of tartaric acid and 0.5 g. of hydroquinone as stabilizer are introduced into a three-necked flask of 500 ml. capacity equipped with a thermostat, a nitrogen inlet tube and a 30 cm.-column with silver lining and attached head and containing 294 g. (2 mols) of N-(α-methoxyethyl)-carbamic acid ethylester, the mixture is slowly heated to the boil at a pressure of 120–130 mm. of mercury, while passing through nitrogen, and the methanol formed as well as the vinyl compound are eliminated at the head of the column, leaving 5 g. as residue. Another distillation of the cracking products (281 g.) yields 59 g. of methanol, 181 g. of N-vinyl-carbamic acid ethylester and 40 g. of the starting product, which corresponds to a reaction rate of 86.4% and a yield of 91% of the theory.

We claim:
1. The process for the preparation of a compound of the formula

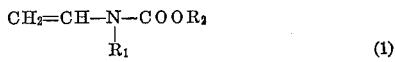

$$CH_2=CH-N-COOR_2 \atop R_1 \qquad (1)$$

in which $R_1$ represents a member selected from the group consisting of hydrogen and lower alkyl, and $R_2$ represents lower alkyl, which comprises the catalytic cracking of a compound of the formula

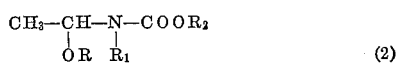

$$CH_3-CH-N-COOR_2 \atop OR \quad R_1 \qquad (2)$$

in which R represents lower alkyl, and $R_1$ and $R_2$ are defined as above, which catalytic cracking is conducted in the presence of a soluble acid imparting to the reaction medium a pH-value between about 3 and about 5.5, at a temperature in the range from about 50 to about 200° C. said soluble acid being used in a proportion of at least 1 mol per mille.

2. The process as claimed in claim 1, wherein as a catalyst a member selected from the group consisting of oxalic acid, succinic acid, tartaric acid, malic acid, lactic acid, citric acid, hydroxy butyric acid, adipic acid, mesoxalic acid, hydroxy pivalic acid, glutaric acid, itaconic acid, and phosphoric acid is used.

References Cited

UNITED STATES PATENTS

| | | | |
|---|---|---|---|
| 2,563,776 | 8/1951 | Dickey et al. | 260—482 |
| 3,019,231 | 1/1962 | Peppel et al. | 260—482 |
| 3,022,336 | 2/1962 | Sennewald et al. | 260—486 |
| 3,115,522 | 12/1963 | Baumgartner et al. | 260—526 |
| 3,176,042 | 3/1965 | Schnizer et al. | 260—526 |

LORRAINE A. WEINBERGER, *Primary Examiner.*

A. P. HALLUIN, *Assistant Examiner.*